United States Patent [19]

Fontana

[11] 4,351,084
[45] Sep. 28, 1982

[54] SOFT TREAD CASTER WHEEL AND METHOD OF MAKING SAME

[75] Inventor: Frank J. Fontana, Stratford, Colo.

[73] Assignee: Stewart-Warner Corporation, Chicago, Ill.

[21] Appl. No.: 86,819

[22] Filed: Oct. 22, 1979

[51] Int. Cl.³ .............................................. A47B 91/00
[52] U.S. Cl. ....................................................... 16/45
[58] Field of Search ..................... 16/45, 46, 47, 18 A, 16/18 R

[56] References Cited

U.S. PATENT DOCUMENTS

| | | | |
|---|---|---|---|
| 1,433,301 | 10/1922 | Robb | 16/45 |
| 1,592,043 | 7/1926 | Noelting | 16/45 |
| 1,682,899 | 9/1928 | Fletcher | 16/45 |
| 2,145,343 | 1/1939 | Dempsey | 16/45 |
| 3,194,293 | 7/1965 | Kindley | 16/45 |
| 4,067,083 | 1/1978 | Green | 16/45 |

Primary Examiner—Doris L. Troutman
Attorney, Agent, or Firm—Augustus G. Douvas

[57] ABSTRACT

A soft tread caster that is manufactured by first molding a relatively rigid plastic hub with integral projections about its periphery and thereafter molding a softer plastic tread directly to the hub periphery so that the tread material flows around and under the projections. The projections consist of two adjacent annular rows of integral T-shaped projections on the outer surface of the hub with the rows being staggered to form a plurality of axially extending holes through the projections. When the tread is molded around the hub, tread material flows under the T-shaped projections securely holding the tread to the hub radially and it also flows through the axial holes, thereby locking the tread to the hub laterally.

14 Claims, 9 Drawing Figures

SOFT TREAD CASTER WHEEL AND METHOD OF MAKING SAME

BACKGROUND OF THE PRESENT INVENTION

Composite molded caster wheels have been provided for many years. Generally these include a relatively rigid central hub surrounded by a softer floor engaging tread to provide greater traction with less wheel noise while at the same time maintaining a high caster load capacity. However, the amount of resiliency in these prior "soft" treads has been severely limited because the softer the plastic selected for the tread, the more difficult it is to anchor the tread solidly to the hub.

For this reason, most prior composite molded caster wheels have required relatively rigid treads, and in many cases, it has been found necessary to mold the tread around the hub including its side surfaces rather than merely about its periphery.

One attempt to solve the problem is found in the Greene U.S. Pat. No. 4,067,083, wherein the tread material is molded around a continuous auxilliary rim about the periphery of the hub. This arrangement does not completely lock the tread to the hub in all directions.

It is a primary object of the present invention to ameliorate the problems noted above in the manufacture of molded caster wheels having a soft outer tread.

SUMMARY OF THE PRESENT INVENTION

In accordance with the present invention an improved soft tread caster wheel and method for its manufacture are provided in which a relatively rigid plastic hub has two rows of integral T-shaped projections in annular array about its periphery. The T-shaped projections in each row are spaced from one another and the projections in one row are displaced angularly from the projections adjacent both sides of each T-shaped projection.

The molded hub is placed in a tread cavity and a relatively soft plastic tread material is molded about the periphery of the hub around the T-shaped projections. Tread material flows under three sides of each of the T-shaped projections, securely locking the tread to the hub rotationally as well as radially outwardly. Tread material also flows through the axial holes between the T-shaped projections. This latter tread material with the assistance of the T-shaped projections, locks the tread to the hub horizontally or laterally even under a considerable load.

There are ten T-shaped projections in each of the rows and the angular spacing between the two rows is 18 degrees to achieve the axial extending openings adjacent the base of each of the T-shaped projections. However, a somewhat lesser or greater number of T-shaped projections may be selected, but the size of the T-shaped projections would be varied to achieve the same through holes adjacent the base of each of the T-shaped projections, but these calculations would be within the skill of one in this art.

DETAILED DESCRIPTION OF THE PREFERRED EMBODIMENT

Figure 1:
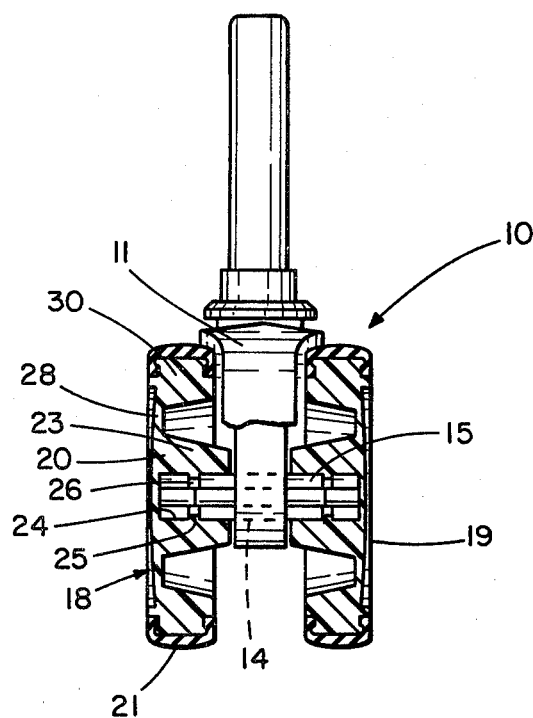
FIG. 1 is a cross-section of a dual wheel caster incorporating two composite wheels according to the present invention.
Figure 2:
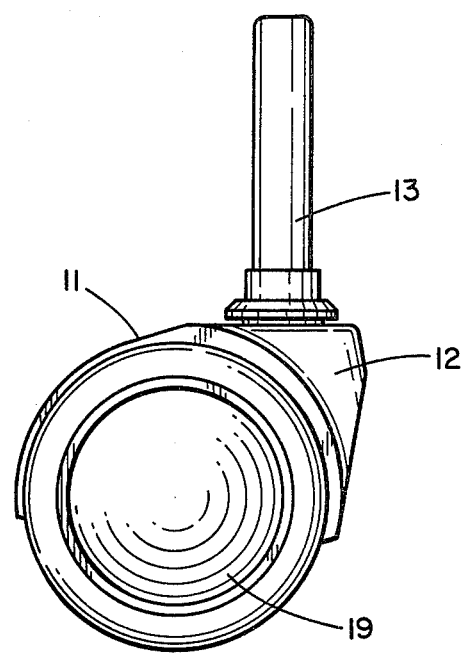
FIG. 2 is a side view of the dual wheel caster shown in FIG. 1.

Referring to the drawings and particularly FIGS. 1 and 2, the present caster wheels according to the present invention are seen incorporated into a dual wheel caster 10 which includes an arcuate central horn 11 having an integral boss 12 that receives a vertical swivel pintle 13 adapted to fit into a sleeve mounted in the object to be supported. The horn 11 has a splined bore 14 that receives an axle 15 that rotatably receives caster wheels 18 and 19 constructed according to the present invention. The caster wheels 18 and 19 are identical so that the present description will be directed to only one of caster wheels 18 and 19.

Figure 3:
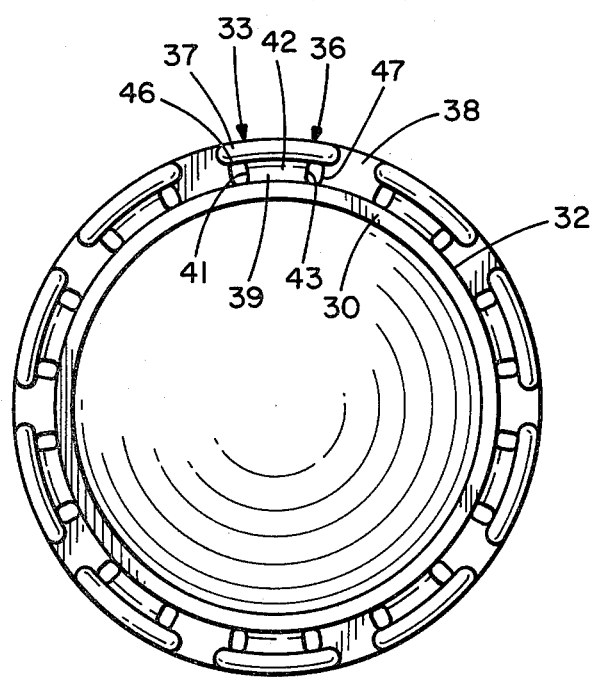
FIG. 3 is a subassembly side view of the hub in the present composite wheel.

Caster wheel 18 is a composite caster wheel in that it includes a relatively rigid molded plastic annular hub 20 and an annular relatively soft molded plastic or rubber tread 21 about the periphery of the hub 20. The hub 20 has a central frusto-conical portion 23 with a central closed end bore 24 having an inwardly directed central annular projection 25 that is received in an annular recess 26 in the axle. This permits the wheel 20 to be snapped onto the axle 15 without the need for special fasteners or separate washers, etc. A relatively thin web portion 28 extends outwardly from the outer side of the frusto-conical portion 23 and continues into an annular rim portion 30. As seen more clearly in FIGS. 3 and 4, the annular rim portion 30 has a flat outer annular surface 32.

Figure 4:
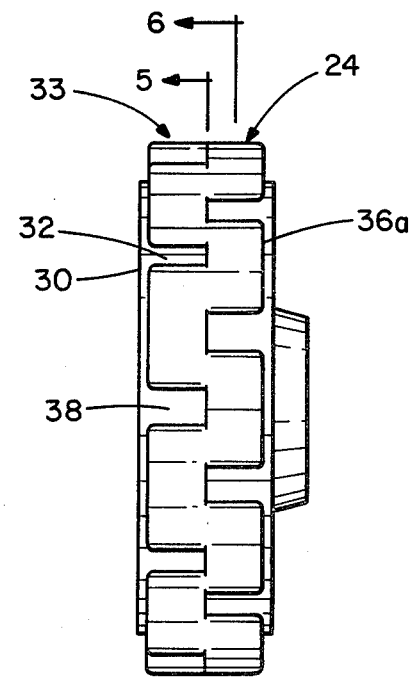
FIG. 4 is a front view of the hub shown in FIG. 3.
Figure 5:
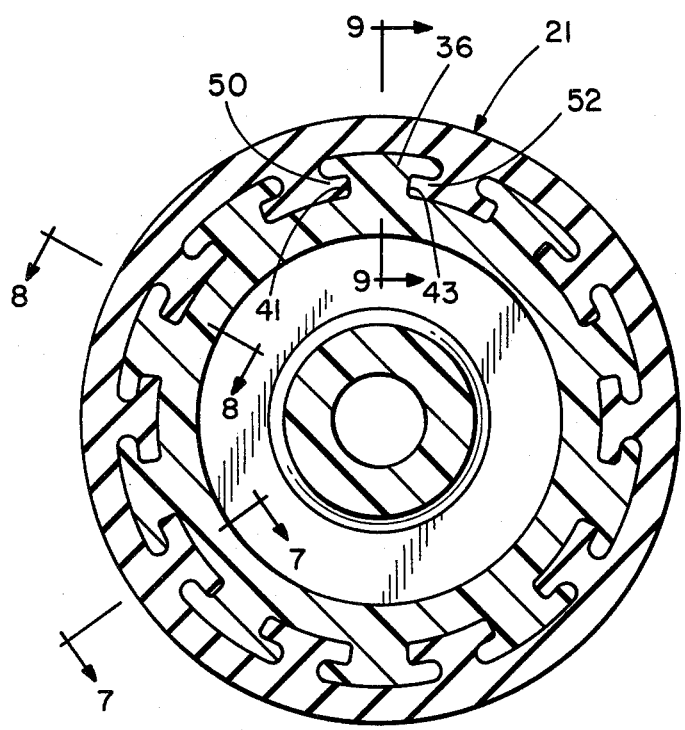
FIG. 5 is a cross-section of the present composite caster wheel with the section through the hub being taken generally along line 5—5 in FIG. 4.
Figure 7:
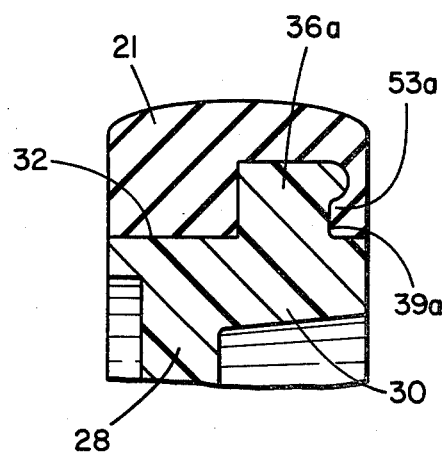
FIG. 7 is a fragmentary section through one of the T-shaped projections in one row taken generally along line 7—7 of FIG. 5.

A first row of integral T-shaped projections 33 projects upwardly and integrally from the annular hub surface 32. A second row of T-shaped projections 34 also projects upwardly from surface 32 with row 34 being staggered with respect to row 33. Each of the T-shaped projections 36 in row 33 includes an arcuate top member 37 having an axial width slightly less than ½ the axial length of rim portion 30 as seen in FIG. 4, as does each of the projections 36a in row 34. There are ten projections 36, 36a in each of the rows 33, 34 and each of the top members 37 and 37a has an arcuate length substantially less than one-tenth the circumference of the hub 20 at its periphery, providing spaces 38 between the projection top members 37 and 37a. The top members 37, 37a are supported on rim 30 by a rectangular post 39 having an arcuate length less than the top members and an axial length also less than the top members, thereby defining with the rim 30 three recesses 41, 42 and 43 between the top member and rim 30.

In the embodiment shown in the drawings, the T-shaped projections 36 in row 33 are staggered 18 degrees with respect to the projections 36a in row 34. The staggering of the rows 33 and 34 produces axially extending common holes 46 and 47 adjacent the bases of each of the T-shaped projections 36 and 36a.

After the hub 20 is molded, it is placed into a suitable molding cavity for tread 21 and the tread 21 is molded directly around the periphery of the hub using a suitable relatively soft plastic or rubber material. As seen in FIGS. 5-9, tread material flows around and under the T-shaped projections 36 and 36a, providing with each projection side locking bars 50 and 52 in recesses 41 and 43 and an end locking bar 53 (FIG. 9) in recess 39. The corresponding recesses and tread bars about projections 36a in row 34 have been designated with the same reference numerals as projection 36 except with the subscript "a" designation in FIGS. 6, 7 and 8 for clarity.

Figure 8:
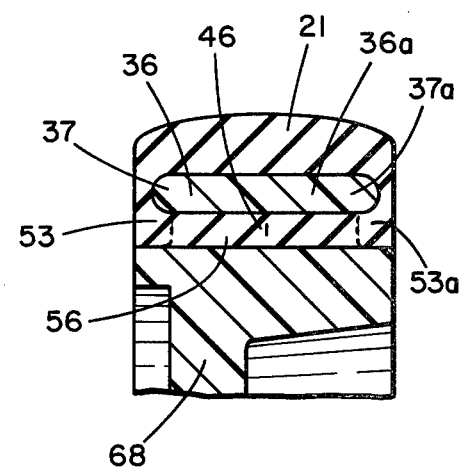
FIG. 8 is a fragmentary section along one of the axial through holes in the hub taken generally along line 8—8 in FIG. 5.
Figure 6:
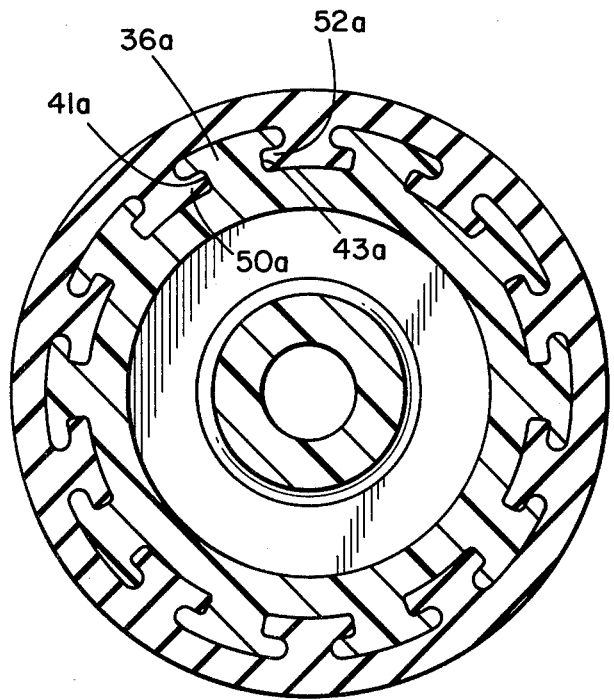
FIG. 6 is a cross-section of the present composite caster wheel with the section through the hub being taken generally along line 6—6 of FIG. 4.
Figure 9:
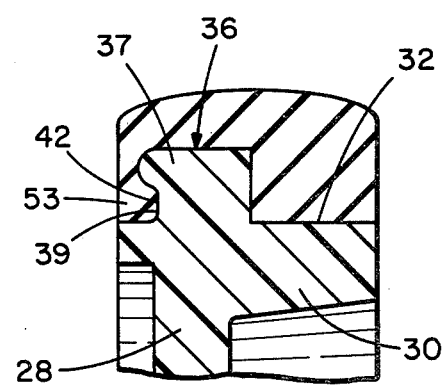
FIG. 9 is a fragmentary section through another one of the T-shaped projections in the other row taken generally along line 9—9 in FIG. 5.

As seen clearly in FIG. 8, hub material also flows through the holes 46 and 47 forming tread crossbars 56 interconnecting the end bars 53 and 53a, forming a plurality of 4-sided locks around the top bars 37 and 37a where they overlap.

The side bars 50,50a, 52 and 52a lock the tread to the wheel hub 20 both rotationally and radially. The end bars 53 and 53a assist in locking the hub to the wheel axially and radially and the crossbars 56 primarily function to lock the tread 21 to the wheel 20 axially, although they also assist in holding the tread to the wheel radially somewhat.

What is claimed is:

1. A caster wheel having a relatively soft tread surface comprising; a relatively rigid wheel member having a hub adapted to receive an axle, a plurality of annularly spaced outwardly extending projections positioned about the periphery of the hub, each of said projections having at least one axially extending recess therein, and a molded relatively soft tread surrounding the periphery of the wheel and extending the projections and into the recesses to fix the tread to the wheel.

2. A caster wheel having a relatively soft tread surface as defined in claim 1, including a second axially extending recess in each of said projections, said molded soft tread extending into each of the second recesses.

3. A caster wheel having a relatively soft tread surface as defined in claim 2, including a second plurality of annularly spaced outwardly extending projections positioned about the periphery of the hub staggered with respect to the first plurality of outwardly extending projections.

4. A caster wheel having a relatively soft tread surface, comprising; an annular wheel member having a hub for receiving an axle, said wheel member being a relatively rigid one-piece plastic molding, an annular recess closely adjacent the periphery of the wheel member on each side thereof defining rims, a plurality of radially extending openings through the rims, and a relatively soft molded tread about the periphery of the wheel member and extending into the recess and the radially extending openings to lock the tread to the wheel member.

5. A caster wheel having a relatively soft tread surface as defined in claim 4, including a plurality of annularly arrayed axially extending openings connecting the annular recesses, said soft tread extending into the axially extending openings to lock the tread to the wheel member.

6. A caster wheel having a relatively soft tread surface as defined in claim 4, wherein there are provided a first plurality of radially extending openings from one of said annular recesses to the periphery of the wheel member, and a second plurality of radially extending openings from the other of said annular recesses to the periphery of the wheel member, said first openings being angularly spaced about the center of the wheel member from the second openings to lock the wheel tread to the wheel member.

7. A caster wheel having a relatively soft tread surface, comprising; a one-piece relatively rigid plastic wheel member, said wheel member having a central hub adapted to receive an axle, said wheel member having a plurality of annularly spaced and arrayed T-shaped integral projections about the periphery thereof, and a relatively soft molded plastic tread about the periphery of the wheel member, said soft molded tread extending under the T-shaped projections to lock the tread to the wheel member.

8. A caster wheel having a relatively soft tread surface as defined in claim 7, including a first plurality of said T-shaped projections and a second plurality of said T-shaped projections, said first plurality of T-shaped projections being angularly related to the second plurality of T-shaped projections.

9. A caster wheel having a relatively soft tread surface as defined in claim 8, and a plurality of axially extending openings through the wheel member between the T-shaped projections, said molded tread extending through the axially extending openings.

10. A method of making a caster wheel having a rigid hub and a relatively soft tread including the steps of; molding a relatively rigid hub member having a central opening and a plurality of projections having recesses on the periphery of the hub, and molding a relatively soft annular tread on the periphery of the hub so that the tread flows into the recesses and around the projections on the periphery of the hub.

11. A method of making a caster wheel having a rigid hub and a relatively soft tread as defined in claim 10, including the step of forming the hub with a plurality of T-shaped projections on the periphery thereof, and molding the tread on the hub so that the tread material flows under the T-shaped projections.

12. A method of making a caster wheel having a rigid hub and a relatively soft tread as defined in claim 10, including the step of forming a plurality of axially extending recesses completely through the hub between the projections, and molding the tread on the hub so that the tread material flows through the axial recesses.

13. A method of making a caster wheel having a rigid hub and a relatively soft tread as defined in claim 10, including forming a first plurality of T-shaped projections on the periphery of the hub, forming a second plurality of T-shaped projections on the periphery of the hub staggered from the first plurality of T-shaped projections, and forming a plurality of axial recesses completely through the hub so that the tread material flows under the T-shaped projections and into the axial recesses to lock the tread to the hub.

14. A caster wheel comprising; an integrally molded relatively rigid wheel having a hub adapted to receive an axle, a first plurality of integral T-shaped projections extending radially outwardly around the periphery of the wheel, a second plurality of integral T-shaped projections extending radially outwardly around the periphery of the wheel adjacent the first plurality of the T-shaped projections with the tops of the first projections being connected to the tops of the second projections, said first projections being angularly spaced from the second projections so that axial recesses extending completely through the wheel are formed adjacent both sides of the bottoms of both the first and second T-shaped projections, and a tread molded around the first and second plurality of projections and extending the axial recesses.

* * * * *